United States Patent [19]
Schimpf et al.

[11] Patent Number: 6,073,410
[45] Date of Patent: Jun. 13, 2000

[54] STRUCTURE AND FORMULATION FOR MANUFACTURE OF PREFABRICATED BUILDINGS

[75] Inventors: Michael J. Schimpf, San Diego; Marcus J. Harrel, Chula Vista, both of Calif.

[73] Assignee: Eco Buliding Systems, Inc., Chula Vista, Calif.

[21] Appl. No.: 09/172,741

[22] Filed: Oct. 14, 1998

[51] Int. Cl.[7] .................................. E04C 2/04; C04B 12/00
[52] U.S. Cl. ...................... 52/481.1; 52/489.1; 52/483.1; 52/434; 156/71; 428/294.7; 106/711; 106/724; 106/802; 106/810; 106/823
[58] Field of Search .................................... 52/483.1, 474, 52/434, 435, 801.1, 250, 319, 326, 327, 333, 335, 338, 341, 479, 481.1, 489.1; 156/71, 291; 428/294.7; 106/711, 724, 802, 810, 823

[56] References Cited

U.S. PATENT DOCUMENTS

| | | | |
|---|---|---|---|
| 1,241,187 | 9/1917 | Berliat | 52/434 |
| 1,778,315 | 10/1930 | Ferguson | 52/474 X |
| 1,902,565 | 3/1933 | Marks | 52/434 |
| 1,959,119 | 5/1934 | Young | 52/341 X |
| 2,029,009 | 1/1936 | Anning | 52/474 X |
| 2,141,919 | 12/1938 | Kotrbaty | 52/481.1 |
| 2,853,394 | 9/1958 | Riddell et al. | |
| 3,214,875 | 11/1965 | Slowinski et al. | 52/483.1 X |
| 3,965,633 | 6/1976 | Carroll | 52/434 X |
| 4,241,553 | 12/1980 | Reicherts et al. | 52/434 X |
| 4,793,861 | 12/1988 | Sohm | |
| 5,225,237 | 7/1993 | Magnani | |
| 5,279,091 | 1/1994 | Williams et al. | 52/481.1 X |
| 5,499,480 | 3/1996 | Bass | 52/653.1 |
| 5,524,412 | 6/1996 | Corl | 52/745.19 |
| 5,644,880 | 7/1997 | Lehnert et al. | |
| 5,664,388 | 9/1997 | Chapman et al. | 52/653.1 |
| 5,692,353 | 12/1997 | Bass et al. | 52/653.1 |
| 5,729,945 | 3/1998 | Menchetti et al. | 52/481.1 X |

FOREIGN PATENT DOCUMENTS 318021  10/1902  France ..................................... 52/435

*Primary Examiner*—Robert Canfield
*Attorney, Agent, or Firm*—Gray Cary Ware & Freidenrich LLP; Stephen E. Reiter; Ramsey R. Stewart

[57] ABSTRACT

The present invention resides in a wall unit and formulation which is particularly advantageous for the manufacture of prefabricated buildings. The wall unit uses a uniquely formulated exterior wall panel that is bonded to a frame of tri-chord steel beams. The unique cementitious composition of the wall unit allows it to be fire and insect resistant and generally impervious to moisture.

9 Claims, 3 Drawing Sheets

STRUCTURE AND FORMULATION FOR MANUFACTURE OF PREFABRICATED BUILDINGS

BACKGROUND OF THE INVENTION

The present invention relates to prefabricated structures, and more particularly, to prefabricated wall units using unique concrete formulations and stud and beam configurations for ease of manufacture.

Existing prefabricated structures may be formed of wall units using C-channel studs such as, for example, the wall units disclosed in U.S. Pat. No. 5,524,412. The wall unit is formed by pouring a first layer of cementitious composition into a mold and placing a frame of C-channel steel beams or studs onto this first layer. A second layer of cementitious composition is poured into a mold to a depth sufficient to cover a flange portion of the C-channel to form the wall unit. However, it is often difficult to fill and cover the C-channel flange, resulting in inefficiencies in manufacture.

Further, the cementitious composition should be formulated to provide a durable surface and to be compatible with a steel stud. Existing wall units based on C-channel steel studs generally require flex anchors for attachment because of a difference in the coefficient of expansion between steel and existing compositions.

Accordingly, there exists a definite need for a prefabricated wall structure having a durable exterior surface that is easily and efficiently attached to supporting stud members. The present invention satisfies these needs.

SUMMARY OF THE INVENTION

The present invention is embodied in a structure and unique cementitious formulation or composition for the manufacture of prefabricated buildings. The unique cementitious composition of the structure allows it to be insect resistant and generally impervious to moisture.

The structure uses a cementitious panel that is bonded to a frame of steel beams by bonding pads. The steel beams may have opposed triangular end portions. The cementitious bonding pads may attach the frame at one of the triangular end portions of the steel beams to the panel. The bonding pads may enclose the triangular end portions of the respective steel beams. The structure may further include a gravity strap that may be attached to each beam at a location on the respective beam corresponding to the bonding pad that is closest to a bottom edge of the structure.

The cementitious panel and the cementitious bonding pads may be formed of a composition, by weight, of about 40.3% cement, about 40.3% sand, about 2.9% glass fibers, about 4.0% acrylic polymer, about 0.4% super plasticizer and about 12.1% water.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention resides in a structure and formulation for the manufacture of prefabricated buildings. The structure uses a uniquely formulated wall panel that is bonded to a frame of tri-chord steel beams. The unique cementitious composition of the structure allows it to be insect resistant and generally impervious to moisture.

Figure 1:
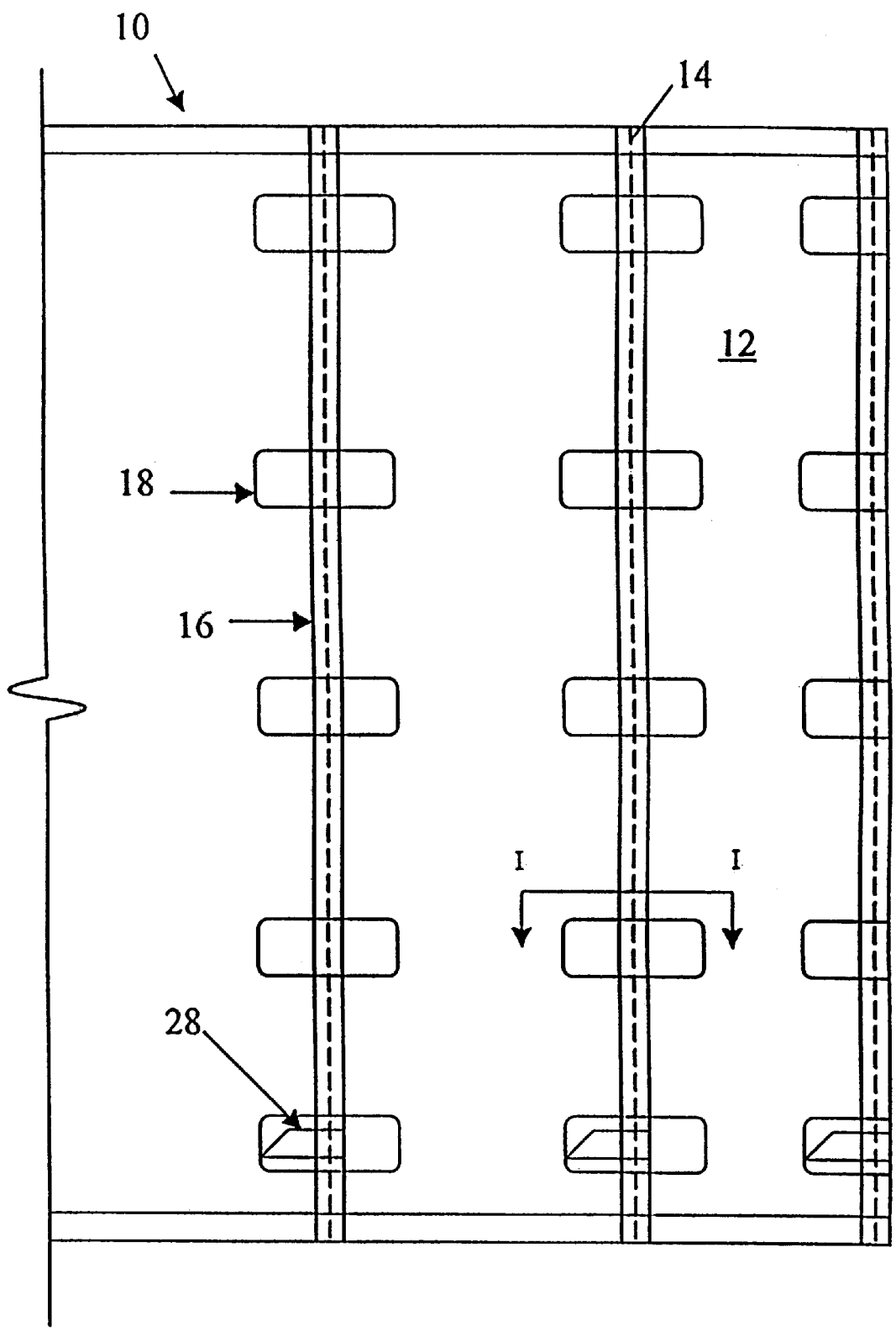
FIG. 1 is an elevation view of a wall unit having frame of lightweight steel beams bonded to a panel of cementitious material of unique composition, according to the present invention.

As shown in FIG. 1, the structure of the invention may be wall unit 10 that is formed of an external wall panel 12 bonded to a frame 14 of tri-chord steel beams 16 by bonding pads 18. The external wall panel is formed of a cementitious composition generally having a thickness of between about ¼ inches and about 1 inch. An advantageous thickness is about ⅝ inches. The cementitious material may be composed of a mixture of cement, polymer, plasticizer, fiberglass, water and sand. The following Table 1 indicates the preferred relative proportions, by weight, of the ingredients for the cementitious material:

TABLE 1

| (Percentage by weight) | Preferred | Limit |
| --- | --- | --- |
| Portland cement | 40.3% | $\geq$25% |
| Sand | 40.3% | $\leq$55% |
| Alkali resistant glass fibers | 2.9% | $\leq$5% |
| Acrylic polymer | 4.0% | $\geq$1.6 % |
| Super plasticizer | 0.4% | $\geq$0% |
| Water | 12.1% | $\geq$11% |

The alkali resistant glass fibers may be provided on spools and are cut into lengths of about ½ inch to about 1½ inches prior to mixing with the other materials. Suitable spools of fiber are available from Nippon Electric Glass America Inc. (Part No. ACS 13H530X). The acrylic polymer may be a Forton compound (VF-774) available from Ball Consulting, Ltd. of Ambridge, Pa. Alternatively, the acrylic polymer may bet a Poly Plex polymer available from Nippon Electric Glass America, Inc. The super plasticizer may be DARACEM 19 available from W. R. Grace of Cambridge, Mass.

Preferably, the cementitious material is mixed together using an automated batch mixer. A typical batch size is approximately 260 pounds with the materials weighed by a computer operated batch load center in increments of ¹⁄₁₀ of a pound. The wet materials (water, polymer, and super plasticizer) are mixed together first. The cement and the sand are added to the wet material and mixed together for 5 minutes to form a slurry. Then the fiberglass is added and the slurry is mixed together for less than 2 minutes. The wet slurry has a pot life of about 1 hour.

Depending on the mixing equipment, smaller batch sizes may be mixed, including batches mixed by hand. Further, the mixing sequence may be changed depending on batch size or mixing equipment. For example, using a tailgate mixer, it may be advantageous to mix the dry material first and then to add the wet materials.

To form the wall unit 10, the mixed slurry is poured into a mold (not shown) having a depth approximately equal to the desired thickness of the external wall panel 12. Form release oil is applied to the mold before the slurry is poured into the mold. The slurry is tamped and evenly spread to fill the mold. After the slurry has been spread to a relatively uniform thickness in the mold, the frame 14 of steel beams 16, which was preassembled, is set into place on the wall panel 12 while it is still in the mold and before the slurry has set.

Figure 2:
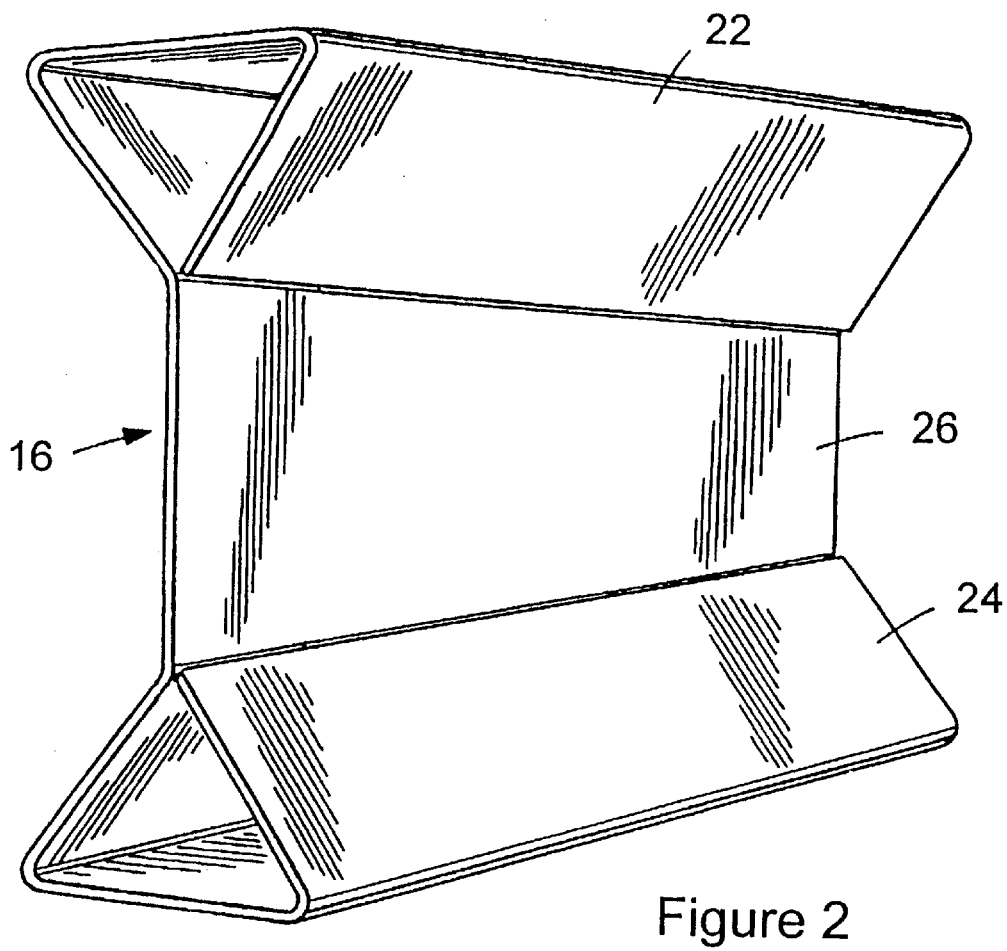
FIG. 2 is a perspective view of a lightweight steel beam for use in the wall unit of FIG. 1.

The steel beams 16 may have a lightweight double triangular shape as shown in FIG. 2. The lightweight beam consists of two triangular end members 22 and 24 and a flat center member 26. The closed triangle beam exhibits excellent structural rigidity using a reduced amount of structural metal. The plate of metal that forms the beam's flat center member may have holes cut or punched in its central portion. The holes allow for a passage for pipes, electrical wires, and the like, through the wall unit. Suitable steel beams are available from Tri-Chord Systems, Inc., 344 Coogan Way, El Cajon, Calif. 92020.

Figure 3:
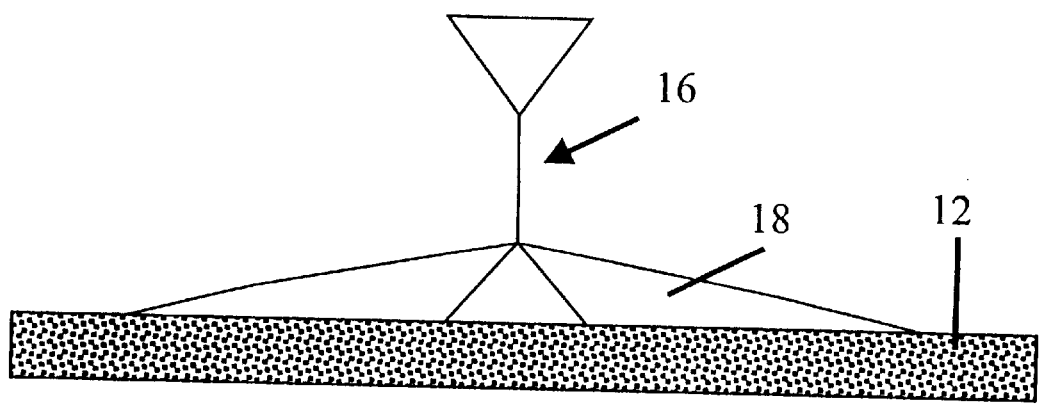
FIG. 3 is a cross-sectional plan view of a bonding pad, taken along line I—I of FIG. 1, showing the bonding pad attaching the steel beam to the cementitious panel.

The frame is attached to the wall panel 12 by mounting patches or pads 18. The pads are formed by placing slurry at points along the individual beams. The pads are tamped into place to integrate them into the wall panel and are shaped by hand or using a tool. Although the pad's shape may vary greatly, a desired pad shape is shown in FIG. 3. The pad may have a width of about 5.5 inches on either side of the beam with the pad's thickness tapering away from the beam. The pad may have a height of about 6 inches. The Tri-chord beam's sloping triangular wall is relatively easy to cover with the patch slurry allowing for efficient manufacture of the wall unit. Thus, the bonding pads may enclose segments of the triangular end portions of the steel beams.

For a wall unit 10 having a height (or beam length) of about 8 feet, five bonding pads; 18 have been found to securely attach each beam 16 to the wall panel 12. The bonding pads may be spaced about 21 inches apart (center-to-center), with the top and bottom pads being no more than about 6 inches from the top and bottom of the frame 14, respectively. The wall unit may vary in height and the number of bonding pads could be increased or decreased proportionally such that the distance between the closest edges of adjacent bonding pads is not more than about 18 inches.

A gravity strap 28 may be attached to each steel beam 16 and covered by a respective bonding pad 18 to prevent slippage over time of the panel 12 down along the length of the beams. The gravity strap may be formed of 22 gauge sheet metal having a width of about 1½ inches and a length of about 5 inches. The gravity strap is attached to the beam by sheet metal screws, welds, or the like.

After the frame 14 has been attached to the wall panel 12 by the bonding pads 18, the wall unit 10 is allowed to cure in the mold for a minimum of 12 hours. The cure time may be reduced using a curing kiln. The wall unit is then removed from the mold by using a spreader bar, clamps and an overhead crane or forklift. The cured wall unit may be stored in a storage rack in a vertical orientation until it is ready for use.

Figure 4:
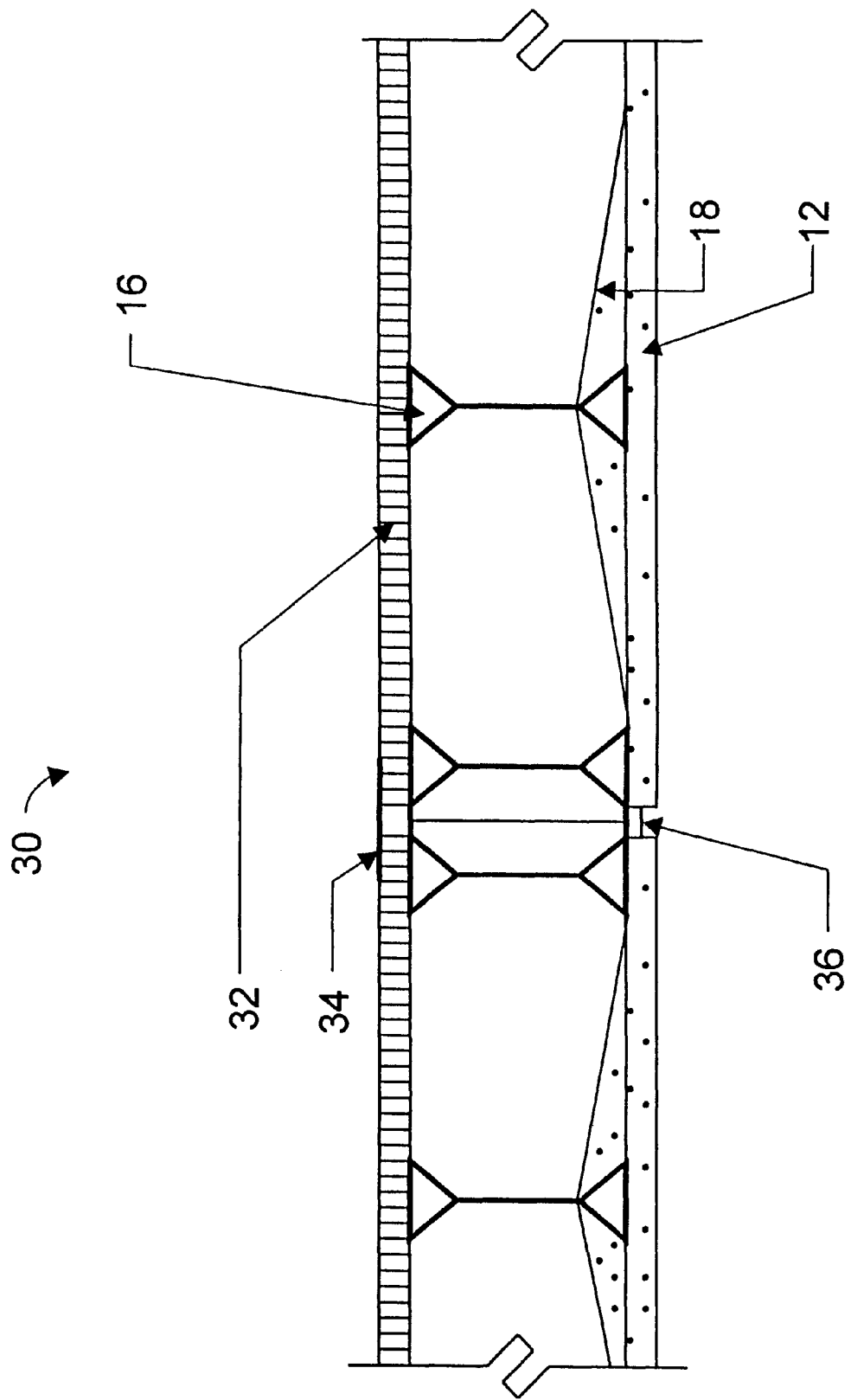
FIG. 4 is a cross-sectional plan view of two wall units of FIG. 1 coupled together to form a larger wall structure.

The wall units 10 may be coupled together to form a wall 30 as shown in FIG. 4. The wall structure's interior surface may be covered by dry wall panels 32 and patched together using drywall tape 34 and drywall compound. Any spaces between the exterior wall panels 12 may be filled with caulk 36. The wall units of the present invention are particularly advantageous for constructing a prefabricated building. The building may be assembled entirely in a factory and shipped to its final destination for attachment to a foundation and utilities.

Although the structure of the invention has been described as a wall unit 10, the structure may also be a roof unit or a floor unit. Further, the cross-sectional height or width of the steel beams could be increased to accommodate an increased bearing load.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A structure, comprising:
    a cementitious panel;
    a frame of steel beams having opposed triangular end portions; and
    cementitious bonding pads that attach the frame, at one of the triangular end portions of the steel beans, to the panel.

2. A structure as defined in claim 1, wherein the cementitious panel and the cementitious bonding pads are formed of a composition, by weight, of greater than 25% cement, less than 55% sand, less than 5% glass fibers, greater than 1.6% acrylic polymer, and greater than 11% water.

3. A structure as defined in claim 1, wherein the cementitious panel and the cementitious bonding pads are formed of a composition, by weight, of about 40.3% cement, about 40.3% sand, about 2.9% glass fibers, about 4.0% acrylic polymer, about 0.4% super plasticizer and about 12.1% water.

4. A structure as defined in claim 1, wherein the cementitious bonding pads enclose segments of the triangular end portions of the respective steel beams.

5. A structure as defined in claim 1, further comprising a gravity strap that is attached to each beam at a location on the respective beam corresponding to the cementitious bonding pad that is closest to a bottom edge of the structure.

6. A structure as defined in claim 1, wherein the height of the structure along the beams is about 8 feet, the cementitious panel has a thickness of about ⅝ inches, and the cementitious bonding pads are spaced about 21 inches apart center-to-center.

7. A cementitious panel composition comprising (by weight) at least 25% cement, less than 55% sand, less than 5% glass fibers, at least 1.6% acrylic polymer, and at least 11% water.

8. A cementitious panel composition comprising (by weight) about 40.3% cement, about 40.3% sand, about 2.9% glass fibers, about 4.0% acrylic polymer, about 0.4% super plasticizer and about 12.1% water.

9. A structure comprising a cementitious panel formed of a composition as defined in claim 8, a frame of steel beams having opposed triangular end portions, and a cementitious pad that attaches the frame, at one of the triangular end portions of the steel beams, to the panel.

* * * * *